United States Patent [19]
Crockett

[11] Patent Number: 5,325,292
[45] Date of Patent: Jun. 28, 1994

[54] TOUR/SCHEDULE GENERATION FOR A FORCE MANAGEMENT SYSTEM

[76] Inventor: Gary B. Crockett, 1508 Anglebluff La., Plano, Tex. 75093

[21] Appl. No.: 97,330

[22] Filed: Jul. 26, 1993

Related U.S. Application Data

[63] Continuation of Ser. No. 596,694, Oct. 12, 1990, abandoned.

[51] Int. Cl.$^5$ ............................................. G06F 15/22
[52] U.S. Cl. ..................................... 364/401; 364/406
[58] Field of Search ............... 364/401, 406, 408, 468; 379/34, 113, 140

[56] References Cited

U.S. PATENT DOCUMENTS

| | | |
|---|---|---|
| 4,510,351 | 4/1985 | Costello et al. |
| 4,700,295 | 10/1987 | Katsof et al. ........................ 364/401 |
| 5,053,970 | 10/1991 | Kurihara et al. ..................... 364/401 |
| 5,111,391 | 5/1992 | Fields et al. ........................ 364/401 |

OTHER PUBLICATIONS

InfoWorld, vol. 9, No. 42, Oct. 19, 1987, Software Review Craig Management, "Schedule Maker" p. 71.
PC Week, vol. 4, No. 2, Jan. 12, 1988, DeJean David, "Who Works When: Schedule Program Juggles Work-Shift Variables", pp. 80-81.
InfoWorld, vol. 10, No. 11, Mar. 11, 1988, Price Sally, "Who Works When: Short Looks", p. 48.
PC Magazine, vol. 8, No. 9, May 16, 1989, "Working Hours: $99.95 Staff Scheduler with Smarts Covers Your Tas", Hung, Brooks, p. 54.
JP 03-102,496 (Nakada et al.) Apr. 26, 1991.

*Primary Examiner*—Roy N. Envall, Jr.
*Assistant Examiner*—Frantzy Poinvil
*Attorney, Agent, or Firm*—David H. Judson

[57] ABSTRACT

A method for planning, scheduling and managing personnel in an environment in which there is a varying workload by time of day and by day of week to be staffed with a team having a variable number of servers. The method defines one or more tour templates, each describing a bounded work shift having work rules and operating constraints. Per-server preferences for particular kinds of work schedules within the limits imposed by the tour templates are also defined, as are various selection policy rules for determining which servers work when the number of servers exceeds the demand therefor. After generating a forecast of an event load expected to occur during a forecast time period and a number of servers required to service the expected event load during the forecast time period, the method correlates the tour templates with the forecast to generate a set of optimal tours, each tour defining a daily work schedule for the forecast time period for a theoretical server. Then, the individual servers are automatically scheduled to the generated tours according to the preferences and the selection policy rules.

4 Claims, 8 Drawing Sheets

FIG. 5

```
NEW TEMPLATE         IEX FORCE MANAGEMENT SYSTEM
                        MODERN TELEPHONE CO.
                           TOUR TEMPLATE
TEMPLATE: __  _____                    WORK DAYS    S M T W T F S
                                          (NO, YES, CAN) N Y Y Y Y Y N

MINIMUM WEEKLY          MAXIMUM WEEKLY               MAXIMUM CONSECUTIVE
DAYS: 5   HOURS: 40:00  DAYS: 5   HOURS: 50:00       DAYS: 5

EARLIEST START:  07:00  LATEST START:    09:00       INCREMENT:  00:15

MINIMUM LENGTH:  08:00  MAXIMUM LENGTH:  10:00

LATEST END:      18:00

NUMBER OF BREAKS: 3     BREAK TIMING METHOD: C
                        (CENTERED
                         ABSOLUTE
LAST MODIFIED _____   RELATIVE)

F3-NEXT BREAKS    F4-PREVIOUS BREAK   F6-DELETE
```

FIG. 8

```
FROM:  4/24/89              IEX FORTEL           APRIL 24, 1989
  TO:  4/24/89           MODERN TELEPHONE CO.        13:30
SHIFT: 1                 SCHEDULE MANAGEMENT
                                                      RTDCs
MANAGEMENT UNIT:  1 WEST OFFICE

61           ----------AM----------|--------------PM----------------
                    7...8...9...10..11..12..1...2...3...4...5...6...7
 LIGHT, CONNIE            ......BB......LLLL.....BB......MMMM...
 WATTERS, KAREN           ........BB......LLLL.......BB....MMMM...
 BIANCHI, JOHN       64   ........BB......LLLL......BB..........
 COOK, LUPE               DDDDDDD........LLLL..........BB..MMM.....
 McNICKLES, LINKA         ........BB......LLLL.......BB......
 PETERSON, MARY           ........BB......LLLL........BB.........
 ANDERSON, LINDA          .........BB.............LLLL..........BB....
 MATARESE, VINCE          ......BB........LLLL.......BBMMMM.....
 STANKEY, JOHN            .....BB..............LLLL......BB..

8:00 AM    REQUIRED: 2   OPEN: 3   NET: 1   CLOSED AVAIL: 0

F3-SORT   F4-FIND   F5-DUP   F6-EDS   F7-SWITCH
```

| | | IEX FORTEL | | APRIL 24, 1989 |
|---|---|---|---|---|
| FROM: APR 24, 1989 | | MODERN TELEPHONE CO. | 72 | 9:05 |
| TO: APR 24, 1989 | | PERFORMANCE ANALYSIS | | RTDCs |
| SHIFT: 1 DAY SHIFT | | | | |

MANAGEMENT UNIT: 1 WEST OFFICE

| TIME | CALLS | | AHT | | OCCUP | | (85% 15) | | STAFF | | | O/D |
|---|---|---|---|---|---|---|---|---|---|---|---|---|
| 74 | 76 | | 78 | | 80 | | 82 | | 84 | | | 86 |
| | FORE | ACT | FORE | ACT | GOAL | ACT | FORE | ACT | OPEN | REQ | ACT | |
| 8:00 | 85 | 90 | 385 | 400 | 80 | 82 | | 69 | | 53 | 30 | -23 |
| 8:30 | 202 | 212 | 385 | 390 | 80 | 84 | | 92 | | 67 | 75 | 8 |
| 9:00 | 374 | | 385 | | 80 | | | 89 | 99 | | 90 | 9 |
| 9:30 | 483 | | 385 | | 80 | | | 77 | 125 | | 142 | -17 |
| 10:00 | 490 | | 385 | | 80 | | | 74 | 120 | | 144 | -24 |
| 10:30 | 487 | | 385 | | 80 | | | 75 | 120 | | 143 | -23 |
| 11:00 | 460 | | 385 | | 80 | | | 73 | 110 | | 142 | -26 |
| 11:30 | 410 | | 385 | | 80 | | | 75 | 114 | | 138 | -24 |
| 12:00 | 384 | | 385 | | 80 | | | 73 | 112 | | 135 | -23 |
| TOTALS: | 8652 | 302 | | | | | | | | | | |
| AVERAGES: | 450 | 151 | 385 | 395 | 80 | 83 | 77 | 81 | 119 | 128 | 52 | -17 |

F3-INTRA    F4-NBR OPEN    F7-SWITCH

TOUR/SCHEDULE GENERATION FOR A FORCE MANAGEMENT SYSTEM

This is a continuation of co-pending application Ser. No. 07/596,694 filed on Oct. 22, 1990 now abandoned.

TECHNICAL FIELD

The present invention relates generally to computerized systems and methods for planning, scheduling and managing personnel in an environment in which there is a varying workload by time of day and by day of week to be staffed with a variable number of servers.

BACKGROUND OF THE INVENTION

Force management systems for use in planning, scheduling and managing personnel in a telephone call center are known in the prior art. Such systems typically include a basic planning capability to enable a call center supervisor to forecast future call loads and the number of servers or "agents" necessary to service that load. Most prior art systems also include a simple scheduling capability which then functions to allocate agent work hours according to the staffing requirements that have been forecast. Agents are then manually or automatically assigned to fill the schedules. These systems usually also include other administrative and reporting capabilities.

Prior art force management systems suffer from many disadvantages. Such systems rely on conventional time-series forecasting techniques to generate forecasts for a large block or unit of time, e.g., a month. These techniques then use fixed factors to decompose the monthly forecast into weekly, daily, and then hourly or smaller increments. This approach is computationally-efficient but lends itself to accuracy only on a macro scale, e.g. month-to-month, as opposed to reflecting real changes in call volumes as they actually occur in the historical data for the call center. Prior art systems thus do not have the flexibility to be responsive to changing conditions so as to forecast future call loads and provide realistic scheduling of personnel to meet the dynamic load requirements of a typical telephone call center.

Moreover, the prior art systems are typically structured around a single call center location. Therefore, while telecommunications switching advances can effectively connect numerous locations together, there is no prior art management system that can provide efficient forecasting and requirements generation at a central location with schedule generation and schedule management at individual dispersed locations. Yet another disadvantage associated with prior art approaches is the inability of such systems to efficiently generate optimal work shifts ("tours") for agents once forecasting is complete. Further, these systems do not have the capability to efficiently generate schedules to satisfy agent preferences, availability and seniority.

The deficiencies of prior art force management systems have given rise to a curious result. In a call center environment, telephone call center supervisors are forced to manage their personnel based on the capabilities of their force management system, as opposed to the capabilities of their switching system and their staffing resources.

It would therefore be desirable to overcome the problems associated with such prior art force management systems.

BRIEF SUMMARY OF THE INVENTION

It is an object of the present invention to provide a force management system and method for planning, scheduling and managing personnel in an environment in which there is a varying workload by time of day and day of week to be staffed with a variable number of servers. One such environment is a telephone call center in which incoming calls are delivered among a plurality of agents for response. While the following description uses a telephone call center as a representative example of one environment for implementing the teachings of the present invention, the invention is not to be construed as limited to the call center application. Indeed, the principles of the invention are applicable to any work environment in which there are required to be varying workloads, by time of day and day of week, to be staffed with a variable number of servers.

It is another object of the invention to describe a personnel resource management system and method for managing large numbers of agents with a single system wherein groups of operators can be geographically-dispersed but still handle the same call type. The invention thus provides the flexibility and control to properly take advantage of the capacities of modern digital switches.

More specifically, the present invention advantageously provides a division of functionality and control between a force management central center, which is responsible for longer term planning and administration, and a plurality of local management units responsible for scheduling and daily management. Preferably, at least one management unit or "MU" is located at a geographical location distinct from other management units of the system. This architecture provides the flexibility to accomodate significant changes in the organization and configuration of call handling units and the relationship between them.

It is another object of the invention to provide a management system for personnel of a call center which includes tools to develop and adjust short term forecasts to quickly reflect special call-handling events and to develop forecasts that capture long-term variations in call activity. In particular, the invention generates a forecast of a call load expected to occur during relatively small individual future time periods, e.g., half hour increments of a work day, as well as the number of agents required to service the expected call load during each individual period. This technique is the opposite from prior art time-series forecasting wherein forecasts are generated in a "top" down approach starting with a large forecasting period, e.g., a month or a week, and using fixed factors to decompose the forecast into smaller units, e.g., a day or a half-hour. The forecasting technique of the present invention also advantageously reflects changes in call activity whichoccur as a result of the fact that the relative position of a period in a month affects call volumes. The invention therefore provides much more accurate forecasts over prior art techniques.

It is still another object to provide an efficient method of generating workshifts or "tours" for agents of a workplace that optimizes the utilization of operator staff. Another object is to provide automatic scheduling of the agents to these tours taking full account of agent availability, preferences, senority and fairness.

It is a further object of the invention to provide a computer-based force management system and method for a telephone call center that plans personnel requirements in line with changing call volumes in a manner that service level requirements are met at the lowest possible cost.

It is still another object to provide a force management system which provides an easy-to-use interface to enable supervisors to view call forecasts and schedules from multiple sites in the call center.

It is a further object to provide a force management system having a unique schedule management visual display to enable supervisors to adequately monitor and revise schedules of agents to insure that call handling responsibilities are met.

Yet another object is to provide a force management system that includes a unique performance analysis visual display which enables supervisors to review detailed real-time data and make quick, informed staffing decisions in response thereto.

In one basic embodiment of the invention, these and other objects of the invention are provided in a method for managing a team of agents at a telephone call center, comprising the steps of:

(a) organizing the team of agents into a plurality of management units, each management unit having one or more groups of individual agents;

(b) defining one or more tour templates each describing a bounded work shift having work rules and operating constraints;

(c) generating a forecast of a call load expected to occur during individual future time periods and a number of agents required to service the expected call load during each individual period;

(d) allocating the expected call load among the plurality of management units;

(e) correlating the tour templates with the forecast to generate a set of tours for each management unit, each tour defining a predetermined daily work schedule for a theoretical agent of the management unit;

(f) assigning the individual agents of each management unit to the generated tours for the management unit; and (g) generating a schedule for each individual agent of the management unit.

Alternatively, steps (e), (f) and (g) are implemented together to automatically assign the individual agents of each management unit to the generated tours for the management unit according to agent preferences, availability, senority and fairness, and then producing schedules for each individual agent.

The organization of the team of agents into management units provides significant advantages over the prior art in that it enables scheduling and management of large, distributed teams of call center agents. Management units are generally located at different physical locations. Therefore, a number of small call center offices can be interconnected and function as one large, efficient call-handling team. Each management unit, however, is managed locally and thus can have its individual work rules add hours of operation. Such individual management of the units facilitates local control of staffing and the ability to handle work rules that may vary from office to office.

The invention also facilitates the efficient management of the individual agents of the management unit based on real-time performance statistics and meaningful display of the generated agent schedules. In particular, unique visual displays of agent schedules and management unit performance are provided to enable local supervisors to make fast, informed staffing decisions for their management unit. The schedule management display is advantageously built around the display of a "time line" for each agent of the management unit, with each unit in the time line preferably corresponding to a predetermined period of time, e.g., a fifteen minute interval. The time line for each agent further includes one or more user-defined schedule activity codes therein, e.g., "B" for break, "L" for lunch, "m" for meeting, etc., for representing the agent's planned status for the day and the nature of any activities that might prevent the agent from attending to incoming calls. Preferably, different activities are displayed in contrasting colors according to activity class denoting potential availability. The system further enables the supervisor to dynamically edit the agent schedules and display lists of agents and their schedules sorted by predetermined criteria such as agent names, members of a carpool, schedule start times, schedule end times, agents having lunch breaks at 11:30, etc.

The schedule management display thus provides a unique time line (as opposed to a textual) representation of agents within a management unit to enable the supervisor to visualize occupancy and potential staffing problems. The schedule management display cooperates with the related performance analysis screen which enables the in-charge supervisor to obtain a meaningful view of what call activity has actually occurred, a best guess estimate of what call activity will occur, and a means of making staffing decisions based on such information. By switching back and forth between the schedule management and performance analysis screens, the in-charge supervisor can make informed staffing decisions.

Staffing changes at the management unit are transmitted back to the centralized computer of the force management system and then regularly broadcast back to the other management units of the system. The performance analysis screen at the management unit is thus continuously updated (in real-time as data is received) with modified team call handling performance data.

The present invention also includes an intra-day reforecasting capability which operates automatically as new data is received (data is usually received every fifteen minutes and posted every half-hour). Intra-day forecasting continually looks at the performance of the system and the original forecast data up to the time of the day for which data has been received. The system reforecasts the conditions expected for the rest of the day using a reality weighting factor, which takes into consideration the amount of data received (i.e., how early in the day the intra-day reforecast is being computed).

The system also includes a "what-if" reforecasting capability to permit the call center supervisor (in the case of the overall team) or the local in-charge supervisor (in the case of the management unit) to determine the effects on team service level if the number of available agents is altered in a particular management unit.

The foregoing has outlined some of the more pertinent objects of the present invention. These objects should be construed to be merely illustrative of some of the more prominent features and applications of the invention. Many other beneficial results can be attained by applying the disclosed invention in a different manner of modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 5 is a representative tour template according to the invention;

FIG. 8 is a representation of the Schedule Management screen of the present invention.

Similar reference characters refer to similar parts or steps throughout the several views of the drawings.

DETAILED DESCRIPTION

Figure 1:
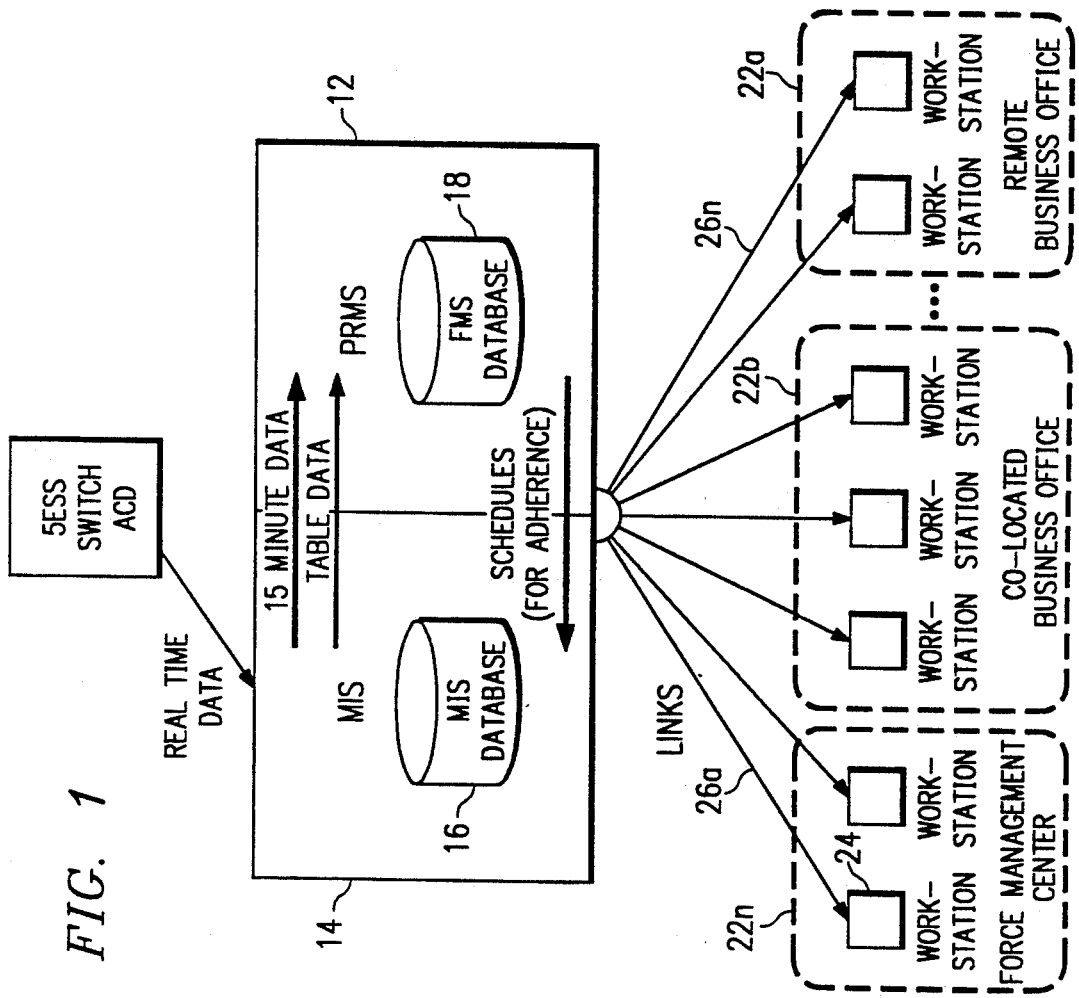
FIG. 1 is a block diagram of the basic architecture of the force management system of the present invention.

As described above, the force management system of the present invention is adapted for planning, scheduling and managing personnel in an environment in which there is a varying workload by time of day and by day of week to be staffed with a variable number of servers. In general, the servers will be required to respond to an event load which has been forecast to occur in the future. One such environment is a telephone call center in which, for example, an "event" is an incoming call to the center. For the remainder of the description, the telephone call center environment is described only for exemplary purposes and not by way of limitation. As seen in FIG. 1, the force management system includes a personnel resource management central computer 12. This computer is connected to a management information system ("MIS") 14, which forms part of a telephone switch and automatic call distributor ("ACD") system known in the prior art, namely, the AT&T 5ESS® Switch ACD/MIS. It is known in the art that an ACD serves to automatically make telephone connections between agent workstations (not shown) and input telephone lines. As shown in FIG. 1, the MIS 14 receives real-time data from the ACD and stores this data in the MIS database 16. Data is delivered to the force management system database 18 of the central computer 12, preferably at fifteen (15) minute intervals. As will be described, agent schedules are delivered from the central computer 12 back to the MIS 14 to enable the MIS 14 to determine adherence to the schedules.

Figure 2:
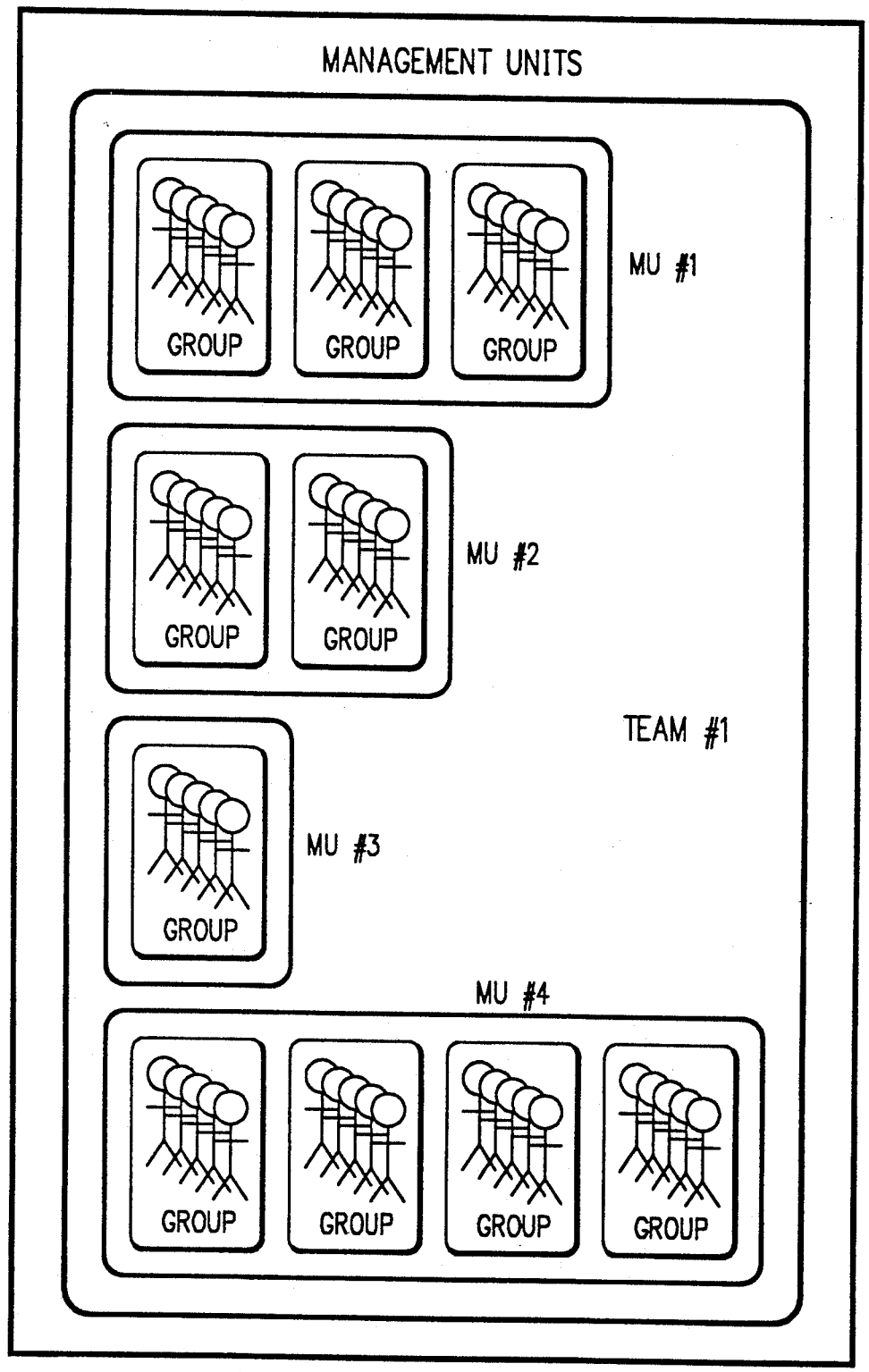
FIG. 2 is a schematic representation of how a team of agents is organized into groups of management units according to the invention.

The centralized computer 12 is linked to a plurality of workstations 24 organized into a plurality of distinct groups or so-called management units 22a, 22b . . . 22n. With reference simultaneously to FIGS. 1-2, a "team" of call center agents is organized according to the invention into the plurality of "management units," each management unit ("MU") having a predetermined number of agent groups. An MU is thus a set of agent groups that is managed locally as a single unit. In this manner, each management unit can have its individual work rules and hours of operation. A management unit can be and is often geographically-separate from other management units. Although not shown in detail, a single telephone switch may likewise be associated with more than one team, and more than one MU can be associated with more than one team. One team can therefore handle one call type while another team handles a second call type. Thus the system is designed to accomodate not only geographical dispersal of management units, but also multiple call types dispersed among multiple management units and multiple geographical locations.

Referring now back to FIG. 1, each management unit has one or more supervisor workstations 24 associated with each group of agents therein. Each of the workstations 24 includes a video display terminal, a keyboard for enabling entry of appropriate administrative commands to manage personnel resources, and a suitable control circuit for controlling communications between the terminal and the central computer via one of the lines 26a-26n. As will be described, the supervisory workstation 24 provides displays of status. The central computer is preferably an AT&T 3B2/1000 Model 80. Each supervisor workstation can be implemented using a personal computer system having a suitable 80286 or 80386 processor, memory storage disks, input/output devices and communications interface equipment.

Figure 3:
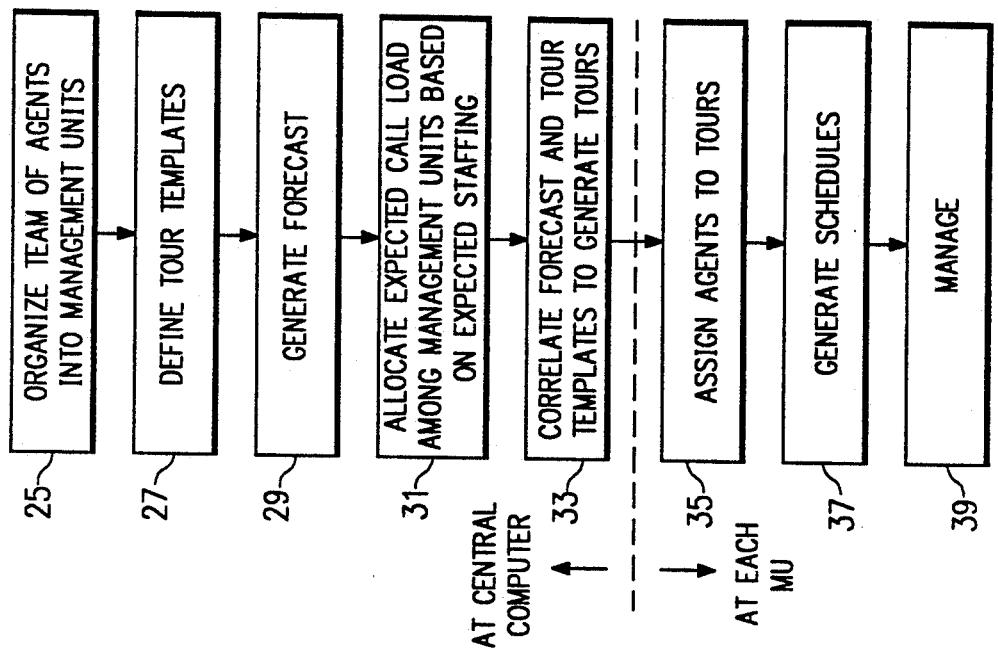
FIG. 3 is a flowchart showing the basic functional steps involved in force management according to the invention.

Referring now to FIG. 3, one method for planning, scheduling and managing a team of agents at a telephone call center according to the invention is described. The method begins at step 25 by organizing the team of agents into a plurality of management units, each management unit having one or more groups of individual agents. As noted above, the organization of the team of agents into management units provides significant advantages in that it enables scheduling and management of large, distributed teams of call center agents. Management units are generally located at different physical locations. Therefore, a number of small call center offices can be interconnected and function as one large, efficient call-handling team. Each management unit, however, is managed locally and thus can have its individual work rules and hours of operation. At step 27, one or more tour templates are defined, each template describing a bounded work shift having work rules and operating constraints. At step 29, a forecast is generated of a call load expected to occur during individual future time periods, e.g., half hour increments, and a number of agents required to service the expected call load during each such individual period. As will be described, forecasting according to the invention takes advantage of the statistical observation that the best single predictor of call volumes in any given period is the corresponding period, by time of day and day of week, of previous weeks. Forecasting of call volumes also relies on other factors such as the relative position of various days with a given month. According to the invention, short-term agent requirements are based on factors such as call load forecast, service level objective, expected agent occupancy and budgeting considerations.

Following the generation of a forecast, the method continues at step 31 to allocate the expected call load among the plurality of management units. This function enables the centralized computer 12 of the overall team to distribute the responsibility for answering calls according to expected available staffing as administratively determined. Moreover, the allocation is variable by each half-hour of each day of the week. This operation enables the call center to realize significant facilities and management cost savings. For example, if there are four MU's expected to have equivalent amounts of staffing but one MU, e.g., MU1, closes one hour before the other MU's, the call center supervisor can setup the allocations for each MU at 25% until the end of the day, when the other three MU's are then each allocated 33.3% of the calls. When MU1 closes, no falloff in service level then occurs. Of course, in operation, incoming calls always go to the first available agent, regardless of the location of that agent.

At step 33, tour templates are -correlated with the forecast to generate a set of "tours" for each management unit, each tour defining a predetermined daily work schedule for a theoretical agent of the management unit. The method continues at step 35 by assigning the individual agents of each management unit to the generated tours for the management unit. At step 37, a schedule is generated for each individual agent of the management unit. Thereafter, once a work shift begins at step 39, the shift supervisor for the management unit manages the agents through the use of a novel user interface as will be described in more detail below.

Figure 4:
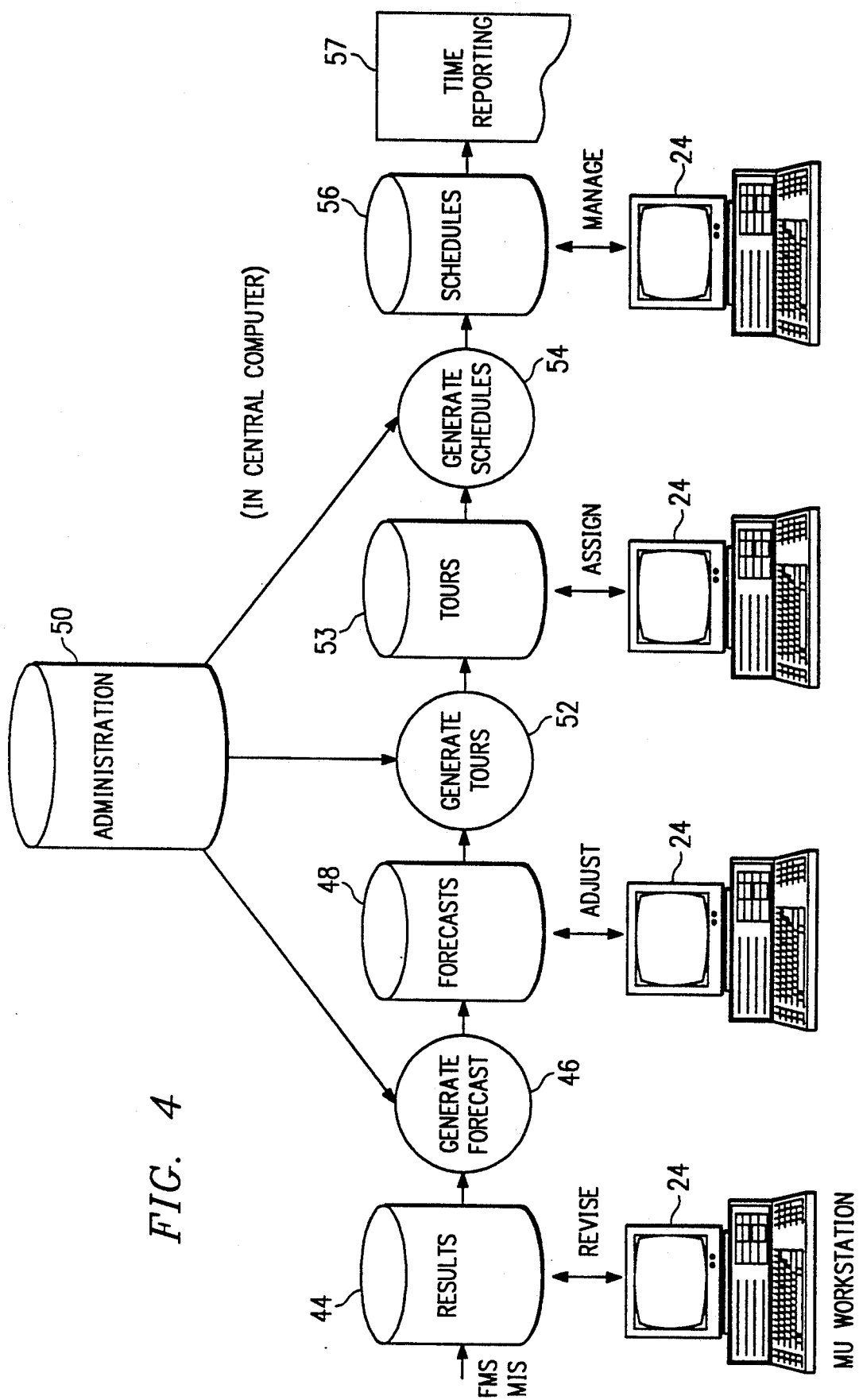
FIG. 4 is a schematic data flow diagram of the functional architecture of the central computer of the force management system of the present invention.

Referring now to FIG. 4, a schematic data flow diagram is shown of the functional architecture of the central computer 12 of the force management system. As seen in FIG. 4, the MIS 12 provides the force management system with statistics concerning incoming calls and the activities of the agents in responding to those calls. The force management system preferably processes data based in thirty (30) minute intervals. Raw statistical data is available from the MIS every 15 minutes, therefore, the system includes a Results database 44 for storing the raw data from the MIS 12. Commands entered via a management workstation 24 are used to revise the data where appropriate. The revised data is then used by a generate forecast routine 46 which generates forecasts that are then stored in a Forecasts database 48. Initially, two basic elements are forecast: Call Volume and Average Handling Time (37 AHT"). Call Volumes and AHT are forecast in preferably half-hour increments. In the call center application, AHT represents the average time an agent takes to handle a call.

In order to generate the staffing requirements, the generate forecast routine 46 uses three (3) other parameters, Service Objective, Occupancy and a Budget factor, provided from an administrative database 50. The Service Objective is the level of service which is desired to be provided to customers. Service Objective is selected by the system operator and is expressed as a percentage of calls answered within a set time. Occupancy is the measure of the percentage of time in which agents are handling calls. The Budget factor represents an allowance for unscheduled unavailability such as absences or vacations. The forecast data and administrative parameters are used by the generate forecast routine 46 to calculate a number of so-called Full Time Equivalent ("FTE") agents for various periods. An FTE is a scaleless number which depends on the time scale being examined. Thus, for a half-hour period, an FTE of fifty (50) means that fifty (50) agents are available for thirty (30) minutes each or that one hundred (100) agents are available for fifteen (15) minutes each, etc.

After generating the staffing requirements for each interval, the force management system enters a scheduling function. The purpose of the scheduling function is to allocate work hours according to the staffing requirements that have been forecast. Scheduling has three basic components: tour generation, agent assignment and schedule generation. A tour is a given work schedule for a set number of working days and includes a start time, an end time, break time(s), meal time, workdays and tour length. Tour generation is the process of matching the staffing requirements with the staffing possibilities, as defined by staffing restrictions such as hours of operation, permissible tour templates and maximum and minimum number or particular tour templates. A tour template defines the boundaries of permissible tours, e.g., the earliest and latest agent start times, maximum hours per week, number of breaks, etc. FIG. 5 shows a representative tour template. According to the invention, tours are generated so that staffing requirements and staffing restrictions are optimized for a low level of over- or under-staffing.

Referring now back to FIG. 4, in one embodiment of the invention a generate tours routine 52 is used to create tours for "theoretical" agents of each management unit based on the tour templates and the forecast FTE requirements for a particular period. Tours, which are stored in Tours database 53, at this point do not have particular agents associated with them. Thereafter, the supervisor(s) assign agents to generated tours using a list of named agents. Alternatively, agents can be assigned using an automatic process instead of manually as will be described below. The daily schedules for every agent are then prepared by a generate schedules routine 54 and stored in Schedules database 56. Time utilization reports 57 can be generated from the Schedules database 56 if desired.

Figure 6:
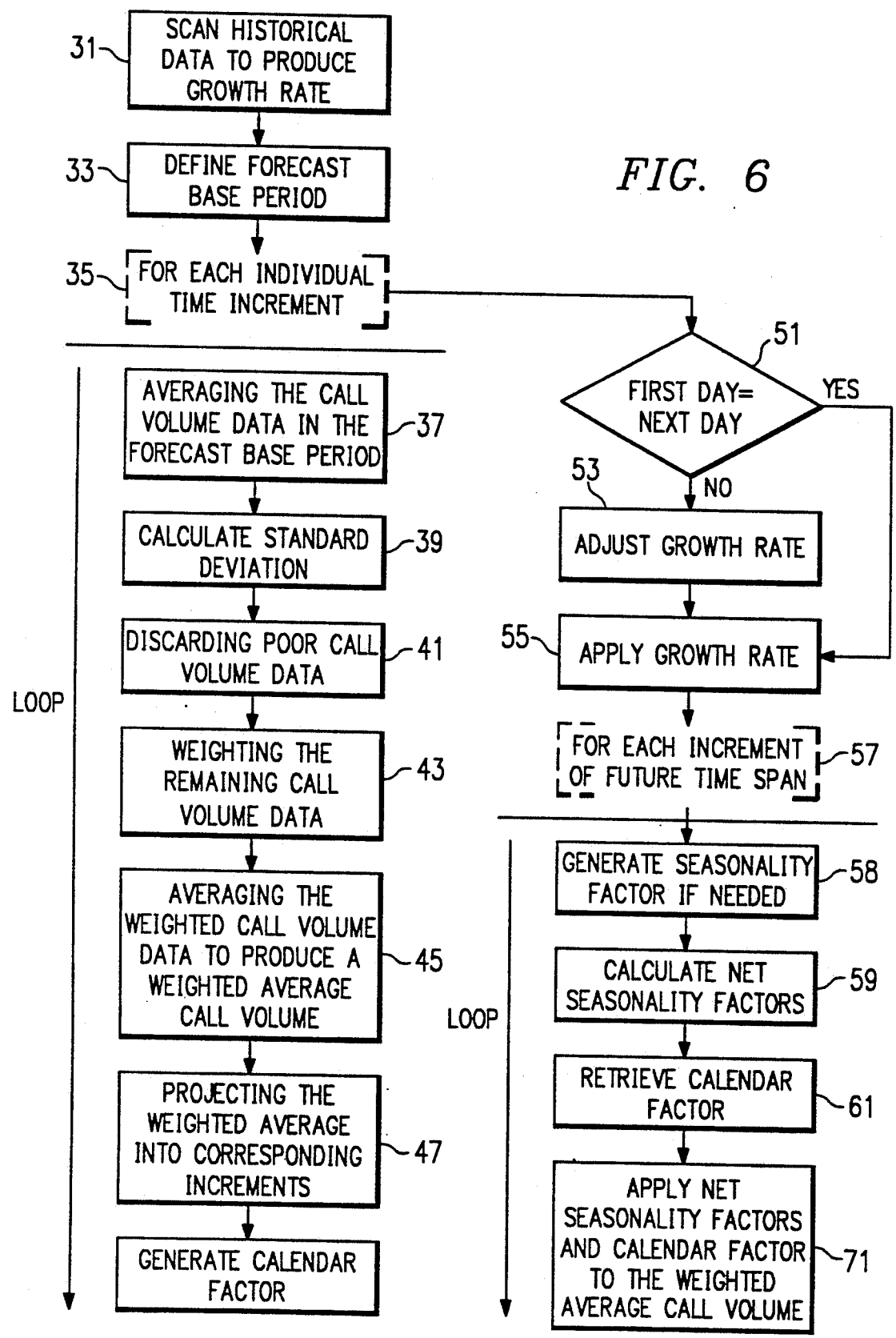
FIG. 6 is a flowchart describing the portion of the generate forecast routine of FIG. 4 used to generate a Call Volume forecast.

Referring now to FIG. 6, the portion of the generate forecast routine 46 of FIG. 4 used to forecast Call Volume is shown in detail. AHT is forecast in a similar manner. As described generally above, forecasting according to the present invention focuses initially on individual small periods of time, e.g., half-hour increments, as opposed to macro or lengthy forecasting periods such as months or weeks. This approach provides significant improvements over the prior art, especially where comprehensive and consistent historical data exists for use in generating the forecast.

Forecasting is based on the statistical observation that the best single predictor of future call volumes in any given period is the corresponding period, by time of day and day of week, of previous weeks. The best predictor of next Monday at 10:30 a.m. is last Monday at 10:30 or rather the series of such recent time periods. The most current data available from the MIS. Indeed, if the forecast is being performed for example on Jan. 15, 1991, then the very best data for use in generating the forecast according to the invention is some period of time (e.g., 13 weeks) leading up to and ending Jan. 14, 1991. As will be seen, this is the technique implemented by the present invention. Moreover, the technique also recognizes and uses calendar variability factors, i.e., the fact that the relative position of a period in a month affects call volumes, to further weight the forecast. For example, often the first Monday in a month has a characteristically different volume from the third Monday. According to the invention, forecasting is carried out by determining the relative weight of these factors in the most current historical data, as determined by a statistical analysis.

More specifically, and with reference to FIG. 6, there is shown a flowchart of a novel method for generating a forecast of Call Volumes expected to occur in a telephone call center during a future time span. The method the force management system historical database which is derived form results received from the MIS. THE FMS database includes historical call volume data preferably up to the very last day (i.e., the "previous day") before the day in which the forecast is being generated. The method begins at step 31 by by scanning the historical data over a predetermined time period (e.g., two years) to produce a historically-observed "growth rate," i.e., a long-term increase or decrease in call volumes. The method then continues at step 33 by defining a "forecast base period" corresponding to a predetermined time period (e.g., 13 weeks) ending with the previous day.

Thereafter, a first processing loop begins at step 35 for each individual time increment of a given day of the week, beginning with a first individual time increment of a week, continuing increment-by-increment and ending with a last individual time increment of the week. Each increment is a half-hour period and thus the loop, for example, begins with the 12:00–12:30 a.m. increment on Sunday morning and continues with each individual increment (12:30–1:00 a.m., 1:00–1:30 a.m . . . ) throughout Sunday. Once Sunday is complete, the loop continues with Monday, and likewise to the end of the week. The loop is complete upon processing of the 11:30–12:00 midnight increment on Saturday night. Of course, depending on the hours of operation of the team during the future span, it should be appreciated that parts of the looping can be skipped.

The following steps are then performed within the first processing loop for each individual time increment. At step 37, the call volume data in the forecast base period is averaged. Using the first increment described above, this step would average the Sunday 12:00 call volume data for each of the 13 weeks in the forecast base period. At step 39, the standard deviation of the averaged call volume data is calculated. Any call volume data that deviates two standard deviations from the mean is then discarded at step 41 to prevent biasing of the forecast. At step 43, the call volume data remaining in the forecast base period is weighted. Weights are assigned to the data under one or more predetermined criteria such as the age of the data, whether the data is true data (received from the MIS) for the system or system initialization data, etc. At step 45, this weighted data is then averaged to generate a weighted average call volume. At step 47, the method continues by projecting the weighted average call volume into corresponding increments throughout the future time span. In other words, if the previous steps have calculated the weighted average call volume for Tuesdays at 9:00 a.m. to be 362, this figure is projected into each Tuesday/9:00 slot of the future time span.

The last step in the loop in the generation at step 49 of a calendar factor (for the increment) from the forecast base period historical data. The calendar factor represents a relative weighting of call volumes by week of month. Each month is by convention separated into first, second, next to last and last weeks. By way of a simple example, assume the historical data shows that 110 calls were received during the particular half-hour on Monday of week 1 of the month in question, that 100 calls were received during the corresponding half-hour on Monday of week 2, that 90 calls were received during the half-hour on Monday of the next to last week, and that 100 calls were received during the half-hour on Monday of the last week. Given 400 total calls or an average of 100 for the particular half-hour/Monday, a calendar factor for the particular half-hour for Monday of week 1 would then be calculated as 110 (the actual number of calls) divided by 100 (the average number of calls) or 1.1; the calendar factor for the particular half-hour for Monday of week 2 would be 100/100 or 1.0, and so forth. If a month has a weekday occurring five times, the calendar factor uses these four variables and calculates the average of the second and next to last weeks as the intermediate week. The calculated calendar factors are stored for the purposes to be described below.

At step 51, a test is made to determine if the first day of the future time span is the next day (i.e., the day after the forecast is being done). If not, then the future time span is sometime in the future and thus the growth rate must be extrapolated to compensate for unforecasted days between the previous day and the actual first day of the future time span. At step 53, the growth rate is therefore adjusted to reflect changes therein which would have occurred between the previous day and the first day. At step 55, the method continues by applying the growth rate, as a daily exponential rate of change, to the weighted average call volumes previously projected for the future time span. The growth rate is applied (as a multiplier) on a day-to-day basis from the first day of the future time span to a last day of the future time span. Thereafter, the routine enters a second processing loop at step 57.

The second loop is then performed for each individual time increment, from the first day of the future time span, continuing increment-by-increment, and ending with a last individual time increment of the last day of the future time period. The loop begins at step 58. As each new month is entered during looping, the method continues by generating a seasonality factor for each such new month. This factor is generated from the two (2) year historical data for each new month of the future time span, and it represents month-to-month percentage increases or decreases in call volumes. At step 59, the method continues by calculating a "net" seasonality effect, the net seasonality effect being based on the relative position in the month of a current time increment. In particular, the seasonality factor is calculated from month-to-month variations and then applied in a forward and backward manner from a month midpoint. For example, assume the historical data evidences that April call volumes are 10% higher than March call volumes and that May volumes are 12% higher than April volumes. Using the 10% and 12% growth rates, step 57 applies implies a 10% growth rate (as a daily exponential rate) for each day between March 15 and April 15, and a 12% growth rate (as a daily exponential rate) for each day between April 15 and May 15. If the relevant time increment is in, for example, April 10th (which is 5 days to April 15th and 21 days from March 15th), then the net forward seasonality factor for the increment on that day will be the forward rate of change raised to the 5th power. The net backward seasonality factor will be the backward rate of change raised to the 21st power. This approach eliminates sharp discontinuities in prior art forecasts which occur across monthly boundaries as growth rates change.

At step 61, the calendar factor for the increment is retrieved. Finally, at step 71, the net seasonality factor and the retrieved calendar factor are applied (as multipliers) to the weighted average call volume as previously adjusted by the growth rate to complete the forecast for that increment. Once the second loop terminates, the method terminates.

Although not described in detail above, data from so-called "special days" (e.g., Christmas, New Year's Day, etc.) occurring during the forecast base period is discarded before processing so that call volume deviations from the special days do not otherwise bias the forecast. Periods for which there is no data for the applicable half-hour period also do not affect the average because these periods are ignored in the averaging calculations.

The method of FIG. 6 advantageously eliminates the need for fixed factor distributions to distribute call volumes from months to weeks, from weeks to days, and from days to half-hour periods. The determination is built into the forecast method itself. This is a powerful, unique approach that overcomes the deficiencies of prior art time series forecasting.

Although not discussed in detail, it should be appreciated that variations in the order of or aspects of the various steps shown in FIG. 6 is within the scope of the inventive technique. For example, to the extent the future time span includes any special day, the forecast thereof is adjusted by the stored distribution and certain call volume adjustment factors for that special day. Moreover, for purposes of computation, the growth rate factor can be applied early on the process by setting up an array corresponding to each half-hour period of each day in the future time span. The average call volume for each half-hour (which will be calculated) is then set equal to an initial value (i.e. 1), and then the growth rate is applied as a daily exponential rate forward through the forecast as discussed above.

The generate forecast routine 46 includes other novel features. In particular, it is known in the prior art to perform so-called "Erlang C" calculations to estimate a specific service level from call rates, average call handling time and the number of agents. According to the present invention, a method is described for using Erlang C in a unique manner in that it takes the call rate, handling time and the desired service level to determine the necessary number of agents (i.e., the FTE). This is "backwards" from the way the Erlang C calculations are normally used. The service level is the percentage of calls answered within the service objective. For example, a service level goal might be that 80% of the calls are answered within 20 seconds. The forecasting method of the invention determines the number of agents necessary to provide a given service level specified rather the service level provided by a given number of agents. The method also directly calculates for all possible combinations of service level time and service level percentage whereas the prior art either forces a set number of fixed numbers (e.g., 70%, 80% or 90% service levels) or extrapolates from such numbers.

Figure 7:
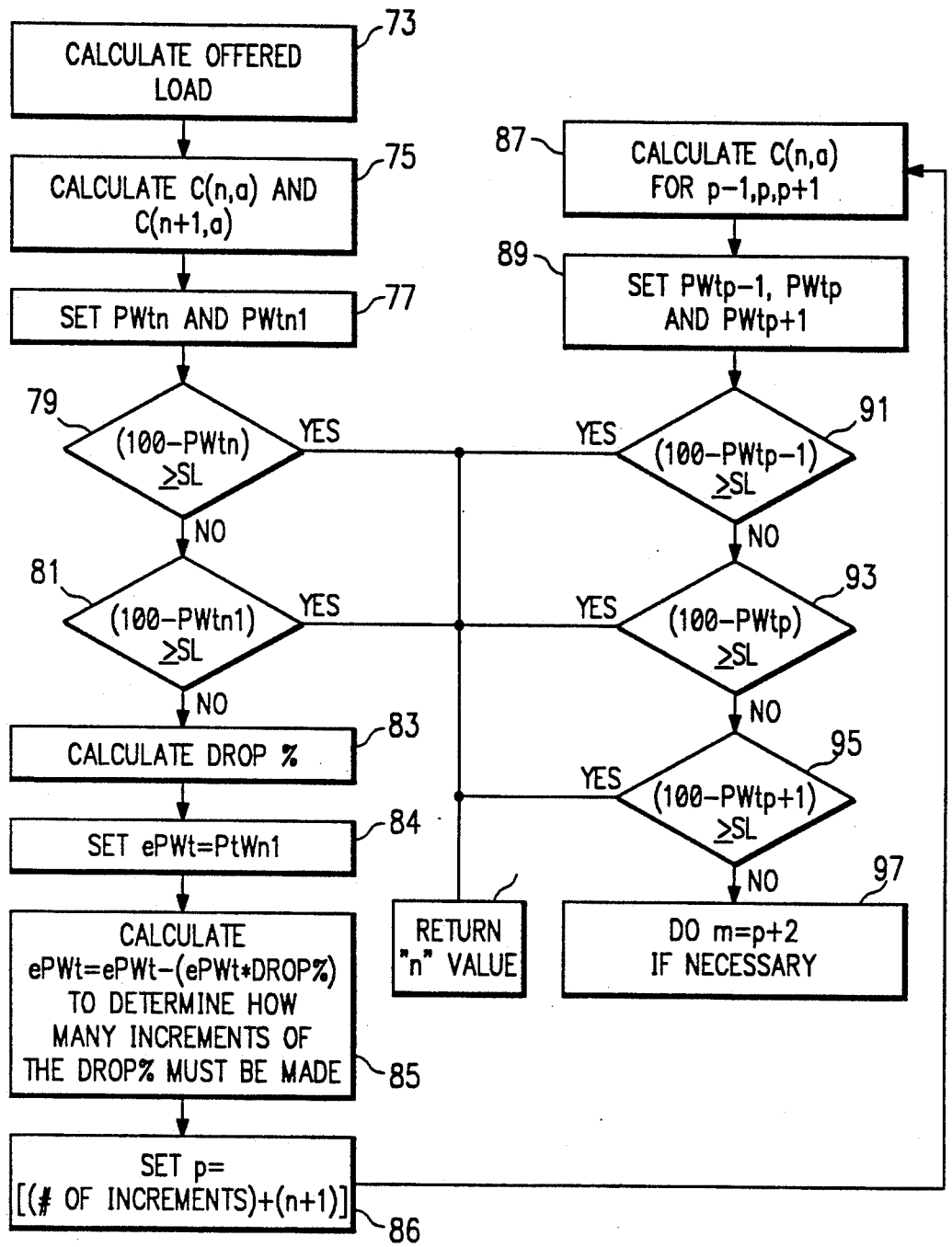
FIG. 7 is a flowchart describing the inverse Erlang C calculation portion of the generate forecast routine of FIG. 4.

With reference now to FIG. 7, a simplified flowchart diagram is shown describing a method for predicting a number of agents required to provide a given service level in a force management system. The service level is defined by a percentage of calls answered within a predetermined time. By way of brief background, the basic Erlang C formula set is shown below:

---

$P\{W>t\} = C(n,a) = A/A+B$, where:
$A = a^n/(n-1)!(n-a)$
$B = $ Summation $(j=0$ to $n-1)$ $a^j/j!$
for $0<=a<n$.
$P\{W>0\} = $ probability of a delay in agent service
$P\{W>t\} = $ probability of a delay $>$ t seconds
$E\{W\} = $ expected delay of service
$W = $ waiting time
$C(n,a) = $ Erlang C formula
$t = $ service objective in seconds
tau $ = $ average holding time
mu $ = $ 1/tau
lambda $ = $ average arrival rate (calls per second)
$a = $ offered load in Erlangs (lambda times tau)
$n = $ number of agents

---

Note that lambda is the arrival rate in calls per second. Therefore, since tau is the time per call, the offered load or "Erlang" number "a" has no units. If the number of available agents is less than or equal to the Erlang number, the number of calls waiting and the average delay will grow without bound.

As described above, the Erlang C formula is used to calculate the probability of delay (and then the percentage of calls handled within some specific number of seconds of delay) given the arrival rate, average call handling time, and the number of agents. In the present invention, the disclosed method is used to predict the number of agents required provide a given service level (percentage of calls answered within some number of seconds).

The method begins at step 73 by calculating the offered load "a." At step 75, the Erlang C calculation $C(n,a)$ is run for n-a+1, which is the minimum of agents for which a meaningful Erlang C calculation can be made. Step 75 also calculates Erlang C for n+1, the next larger integer. According to the invention, the following approximation is exploited: the percentage reduction or "drop" for one more agent is nearly constant; i.e. if n+1 yields a $C(n+1, a)$ 10% less than that for n+1, then $C(n+2,a)$ would be a little more than 10% less than that for n+1. More specifically, assume that for n (which is equal to a+1) 90% of calls are forced wait and that when one more agent is added (n+1), the percentage of those calls forced to wait drops to 80%. Using this example, a drop value percentage of (90-80)/90 or 11% is then, by the approximation, what would be expected to happen to the percentage of calls forced to wait if another agent (n+2) is added. In other words, since 11% of 80% is 8.8% then approximately 71.8% of calls would be forced to wait if n+2 agents are used to receive incoming calls.

Turning now to the specific method, at step 77, the routine sets the variable PWtn=$P\{W>t\}$ for $C(n,a)$ and PWtn1=$P\{W>t\}$ for $C(n+1,a)$. PWtn is the percentage of calls that wait more than "t" seconds if there are "n" agents (and thus the service level associated with "n" agents is (100-PWtn)); PWtn1 is the percentage of calls that wait more than "t" seconds if there are "n+1" agents. At step 79, a test is run to determine whether "n" is the correct number of agents by determining if (100-PWtn) is greater than or equal to the desired service level. If so, the routine returns "n" and the routine terminates. If (100-PWtn) is not greater than or equal to the desired service level, at step 81 the routine determines whether n+1 is the correct number of agents by determining if (100-PWtn1) is greater than or equal to the desired service level. If so, the routine returns n+1 and terminates. If not, the method continues at step 83 to calculate a drop percentage value=(PWtn-PWtnl)/PWtn. At step 84, an estimated percentage waiting time "ePWt" is set equal to PWtnl. At step 85, a loop is carried out to calculate ePWt=ePWt-(ePWt*drop), which determines how many increments of the drop percentage must be made until the value (100-ePWt) is greater than or equal to the desired service level. At step 86, the number of iterations of the loop plus the value (n+1) is then set equal to a predictor value "p."

In particular, at this point the method has located a value (100-ePWt) which is approximately the desired service level. The use of the loop in step 85 is extremely advantageous because it obviates those expensive and time-consuming calculations of C(n,a) and PWtn (for numerous intermediates values of "n") which otherwise would have been necessary in order to reach the approximate desired result. At step 87, the conventional Erlang C calculations are performed for C(p-1,a), C(p,a) and C(p+1,a). The routine continues at step 89 to set PWtp-1=P{W>t} for C{p-1,a}, PWtp =P{W>t}for C(p,a) and PWtp+1=P{W>t} for C(p+1,a). At step 91, a test is done to determine if (100-PWtp-1) is greater than or equal to the desired service level. If so, the routine returns "p-l" and the method terminates since p-l is the correct answer. If the test 91 at step is negative, the routine continues at step 93 to determine if (100-PWtp) is greater than or equal to the desired service level. If so, the routine returns p and the method terminates. If not, at step 95 the method tests whether (100-PWp+1) is greater than or equal to the desired service level. If so, the routine returns p+1 and terminates. If necessary (if PWp+1 is not greater than or equal to the desired service level), the method continues at step 97 to perform another loop for m=p+2 as described until PWt is greater than or equal to the service level for m=m+1 and PWt=P{W>t} for C(m,a).

Therefore, according to the method of FIG. 7, two initial guesses (namely, the minimum number of agents n and n+1) are used as predictor values and a first loop is run up in step 85 to determine a value (100-ePWt) which is approximately the desired service level. At this point, the method checks the estimate by calculating Erlang C for p−1, p and p+1. Calculating the actual C(p-1,a), C(p,a) and C(p+1,a) and service level exact values, one of the three is hopefully a winning value. Generally, the winning value will be the central predicted value p for most common input data. Stated differently, the routine uses the numbers for n and n+1 to predict the value "p" which brings a result close to the desired objective. The Erlang C loop is then continually run up to calculate C(p−1,a), C(p,a) and C(p+1,a). Typically, a winner will be find in one of these three results; if not, the routine keeps running from p+1, p+2, etc. until it does find the winner.

The force management system of the present invention also provides significant management capabilities as compared to prior art systems and techniques. The central computer 12 administrative functions (e.g., MU allocations) are controlled by a team supervisor responsible for long-term planning and oversight of the entire team of agents. Management units, to the contrary, are preferably responsible for daily schedule management and are thus controlled by an in-charge or "shift" supervisor. This architecture dictates that the various responsibilities of the supervisors, especially at the MU level, are dictated by the capabilities of that portion of the system for which they are responsible. Stated differently, the force management system is organized functionally into different areas of responsibility, such as planning, managing, administration, etc. Therefore, efficient security controls and the like can be readily implemented into the system.

Figures 9, 10:
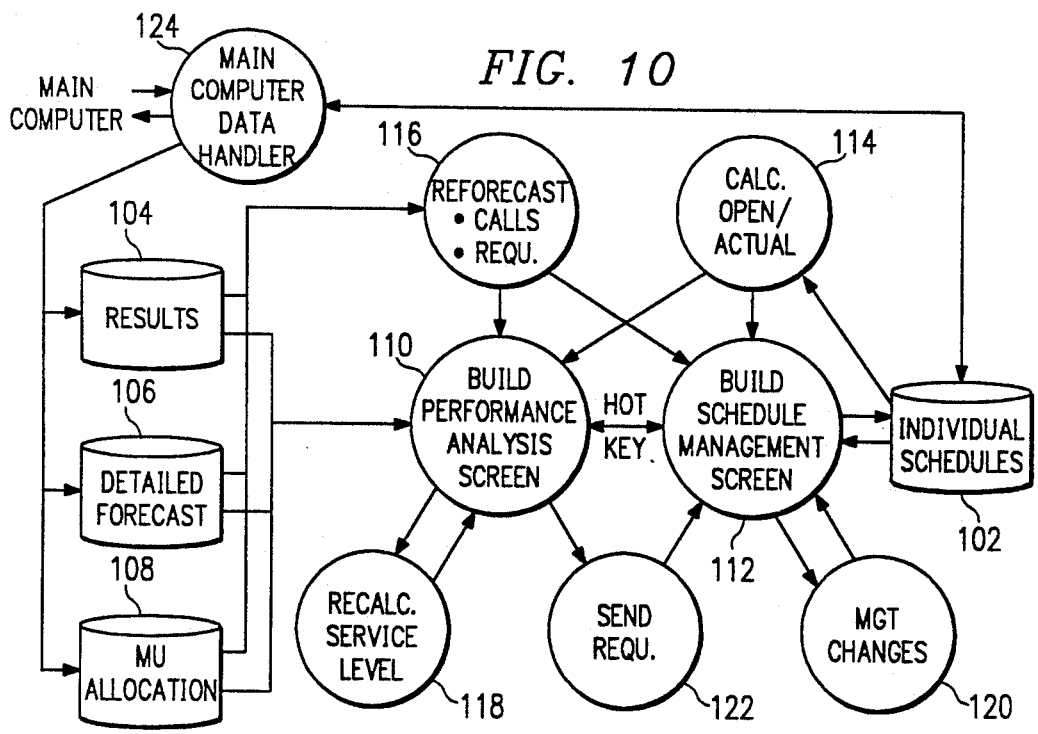
FIG. 9 is a representation of the Performance Analysis screen in a forecast mode of operation.
FIG. 10 is a data flow and functional architecture of one of the MU workstations showing the details of how the Schedule Management and Performance Analysis screens are built.

As noted above, the force management system implements a unique user interface at the management workstation (of the central computer 12) and the MU workstations. With reference now simultaneously to FIGS. 8-9, a schedule management screen 60 and a performance analysis screen 62, respectively, are shown. These screens are implemented at the MU workstation to enable the in-charge supervisors, by shifting back and forth therebetween, to make informed staffing decisions for their management units. Referring now to FIG. 8, the schedule management screen 60 is built around the display of an agent list 61, a timescale 63, an array of schedule activity codes 65, and a net staffing field 67. The array is subdivided into a "time line" 64 for each agent of the management unit, with each unit in the time line preferably corresponding to predetermined period of time, e.g., fifteen minute intervals. The timescale 63 preferably displays each "hour," with quarter hours represented by dots:

| AM | PM |
|---|---|
| 8...9...10...11...12...1...2...3...4...5...6...7...8 | |

The time line 64 for each agent includes one or more user-defined schedule activity codes 66 therein, e.g., "B" for break, "L" for lunch, "m" for meetings, etc., for representing the agent's status and/or the nature of any activities that prevent the agent from attending to incoming calls.

As shown in FIG. 8, the time line 64 begins with the schedule start time of the first (i.e., top) agent displayed. The time line 64 thus begins at the first scheduled 15 minute time period of the first agent listed. Scrolling to the left or right using conventional cursor keys permits the operator to view additional scheduled hours. When scrolling occurs, the start and stop times on the time line scroll as well.

As seen in FIG. 8, the schedule management screen 60 designates a number of function keys in a lower field 65 of the screen. According to the invention, the system includes suitable program means, responsive to depression of a Sort function key, for performing one or more sort functions. For example, agent names can be sorted in alphabetical order. Agent schedules can be sorted according to various start time(s) or ending time(s) beginning with the earliest start time or the latest ending time(s). Agents can be sorted by other user-defined criteria such as the members of a carpool(s), those agents having a lunch break at 11:30, or the like. The system also includes program means responsive to depression of a Find function key for enabling the operator to locate an agent. Once located, that agent is at the top of the agent list and thus the time line may shift depending on whether the located agent has a start time different from the first agent previously displayed. As also seen in the figure, the screen 60 also identifies a Switch function key. Depression of the Switch function key toggles the display to the performance analysis screen 62 of FIG. 9.

The schedule activity codes 66 are preferably color-coded and represent the status of the agent, namely, whether the agent is "Open" and thus able to handle calls or "Closed" and the reasons therefor. Status codes may have different letters identifying different reasons for unavailability such as "B" for break, "L" for lunch, etc. By way of example only, the following codes and their color representations may be used:

| Code | Color | Meaning |
| --- | --- | --- |
| Period | White | Scheduled open (on calls) |
| "D" | Red | Closed, out of office |
| "L" | Green | Closed, at lunch |
| "B" | Green | Closed, on break |
| "M" | Yellow | Closed, but available to open |
| "C" | Light Blue | Closed key office functions |
| "2" | White | Overtime Type 2 |

The activity codes are edited within the time line boundary. The time line may be extended by special overtime codes. Changes are made by positioning a cursor on the required time slot and replacing the current scheduled state with the desired scheduled state. The display 60 also includes the net staffing field 67 which identifies quarter-hour staffing summary data depending on the cursor time line position. This data includes the number of required agents for the quarter-hour increment, the total number of agents whose current state is Open (i.e., available to handle an incoming call), a Net value equal to the number of Open agents minus the number of required agents, and a number of Closed Available agents, i.e., agents then presently working on administrative functions (recordkeeping, etc.) but that can be made available to receive calls. Preferably, the Net value is displayed in red when its value is negative and displayed in green when its value is positive.

The schedule management display thus provides a unique time line (as opposed to a textual) representation of agents within a management unit to enable the supervisor to visualize occupancy and potential staffing problems. The schedule management display cooperates with the related performance analysis screen 62 of FIG. 9 which enables the in-charge supervisor to obtain a meaningful view of what call activity has actually occurred, a best guess estimate of what call activity will occur, and a means of making staffing decisions based on such information. By switching back and forth between the schedule management and performance analysis screens, the supervisor can make fast, informed staffing decisions.

With reference now to FIG. 9, the details are shown of the performance analysis screen 62 during a forecast mode of operation. As will be described in more detail below, the system also includes an intra-day reforecasting capability and thus the performance analysis screen can also operate in an intra-day mode showing real-time reforecasts for remaining half-hour intervals of the workday. The screen includes a Management Unit identifier field 70 to identify the MU performance data being displayed. The performance analysis screen shows the MU's allocation of team data. In the forecast mode of operation, as shown in FIG. 9, the screen displays the data that was originally forecast for the particular day (before any is intra-day reforecasting is performed). A date/time field 72 identifies the date and the actual time. A Time column 74 separates the data into preferably half-hour increments beginning with the shift, in this case 8:00 a.m. The performance data includes the following data fields: Calls 76, average handling time (AHT) 78, Occupancy 80, Service Level 82, Staff 84 and Over/Under 86.

The Calls field 76 has two subfields, "Fore" and "Act." "Fore" represents the original forecast call values for the half-hour increments and "Act" is the actual number of incoming calls provided from the MIS (and thus updated every half hour). The AHT field 78 likewise includes a Fore and Act subfield to display the average handling time per call as originally predicted and as measured by the MIS. The Occupancy field 80 includes a "Goal" subfield and an "Act" subfield to display predicted and measured levels of staff occupancy, respectively. Occupancy data is displayed as a percentage. The Service Level field 82 includes the "Fore" and "Act" subfields identifying the predicted and measured service levels, respectively, expressed as the percentage of calls answered within a given amount of time. The Staff field 84 includes three subfields: "Open," "Req" and "Act." The Open subfield identifies the number of scheduled open staff, i.e., agents available to handle calls. "Req" is the number of required staff, and "Act" is the number of staff actually there. At any one time, either the Open subfield or the Act subfield has data (the other being blank). The Open subfield is shown for future periods for which there is no MIS data yet. The Act subfield is shown for those time periods for which there is MIS data. Finally, the Over/Under field 86 represents the difference between the number of required "Req" staff and the number of actual "Act" or scheduled Open (depending on which is shown) staff. Positive numbers indicate an over-capacity condition, while negative numbers indicate under-capacity. Negative numbers are preferably displayed in red to insure that the operator is immediately aware of the potential problem.

The performance analysis screen includes a number of function keys 88. The Switch key toggles the display back to the Schedule Management screen of FIG. 8. Depression of the Intra Key enables the operator to change the mode of operation to an "intra-day reforecasting mode." Intra-day forecasting continually looks at the performance of the system and the original forecast data up to the time of the day for which data has been received. Using a reality weighting factor, which takes into consideration the amount of data received (i.e., how early in the day the intra-day reforecast is being computed), the system reforecasts the conditions expected for the rest of the day. The intra-day mode is entered upon depressing the Intra key of the terminal. The Intra-day forecast is accomplished by applying a ratio of actual to forecast data to each of the remaining cells (i.e., half-hour increments) that have no real data, moderated by a reality ratio as will be described below in more detail with respect to FIG. 10.

According to another feature of the invention, local staffing changes at the MU level (which as described above are implemented by the in-charge supervisor) are transmitted back to the central computer databases and are rebroadcast back (preferably in real-time as data is received) to all affected management units in the system. Therefore, all of the MU supervisors can continuously view the team statistics even as local staffing changes are dynamically implemented at other management units. Referring briefly to FIG. 9, the AHT, Occupancy and Service Level fields reflect team data while the Calls, Staff and O/U fields reflect MU data, after allocation based on the appropriate MU percentage.

The system also provides a "what-if" capability to allow the call center supervisor or in-charge supervisor, as the case may be, to play "what-if" games with the number of scheduled open agents for a particular time period. Thus, the call center or "team" supervisor can monitor the forecasted call activity for the entire team and can see the effects on team service level of altering the number of open agents for the rest of the shift. For example, if the MU supervisor desires to determine the effects of some unexpected agent absences, an Nbr Open key of the terminal is depressed. When the key is struck, a detail window appears on the screen:

"Number Open of__for HH:MM produces Service
Level of XX%"

The entry field will default to the value (number) of Open key agents displayed on the current Schedule Management screen. The HH:MM reflects the time row that the cursor was positioned on when the function key was depressed. When the a new value of the number of open agents is entered, the system calculates the expected service level for the period. The cursor stays on the entry field so that different values may be tried. Once the effects of the absences are determined, the in-charge supervisor can toggle back to the schedule management screen and modify agent schedules accordingly if necessary.

Referring now to FIG. 10, data flow within an MU workstation is shown in detail. The workstation datastores are those required by the system to support local (i.e., MU) needs of the in-charge supervisor for a particular MU. Thus, the data brought down and stored at the workstation is only that necessary and sufficient for MU management. As seen in FIG. 10, the workstation includes an Individual Schedules dataset 102 which contains the schedules of a particular day for the agents of a particular MU. A Results dataset 104 contains the actual call volume and agent performance statistics recorded for the entire team at half-hourly intervals. It is a replica of the set stored on the central computer, but generally only the actual data for the current shift is stored locally. A Detailed Forecast dataset 106 contains the predicted half-hourly call volume and AHT. Carried with this dataset are the MU allocation numbers for the corresponding halfhour periods. An MU Allocations dataset 108 provides the definitions of the MU allocation numbers. The definitions give the percentage of the incoming calls directed to particular MU's.

The workstation includes two build functions: a build performance analysis screen function 110 and a build schedule management screen function 112. As described earlier, the in-charge supervisor can toggle or "hot-key" back and forth between these two functions. The build performance screen function 110 operates as follows. Assume that at the start of the shift there is no past data for that shift, i.e. there is no data in the workstation Results dataset 104. Thus, the data to be written to the screen is forecast data from the workstation Detail Forecast dataset 106. Referring briefly back to FIG. 9, the first column to be written is the forecast Calls 76 allocated to that particular MU. The build function 110 derives the MU call volumes from combining the team call volume predicted for the shift in the Results dataset 104 and the MU allocation from the MU Allocation dataset 108. As described previously, the screen items AHT, Occupancy and Service Level are all team parameters and are taken from the Detailed Forecast dataset 106 directly.

The Staff column 84 of FIG. 9 is the staffing for the MU. The required MU values (Req) are calculated from the required team values and the MU allocations for the shift. The number of Open agents for the shift is calculated by subprocess 114 from the workstation's Individual Schedule dataset. After the end of every half hour period, actual performance data is received from the central computer 12. The team values for that half-hour, namely, AHT, Occupancy and Service Level, are written directly from the data. The MU Call Volume is calculated from the MU allocation of the actual team call volume. MU Required staffing remains unchanged and the actual MU staffing is obtained from the central computer by way of the MIS.

As described above with respect to the intra-day reforecasting capability, every half hour throughout the shift, the call volumes for the rest of the shift are recalculated based on the actual call volume data received earlier in the shift. The recalculation is performed by subprocess 116. Again, the calls are forecasted for the MU on an allocated basis. The number of MU agents required for the reforecast MU call volumes is calculated using an Erlang C method. These reforecasted values do not have to be stored or sent back to the main computer data base.

An example of the intra-day reforecasting provided by subprocess 116 can now be described. According to the technique, a reforecast ratio (Rf) is first generated equal to the summation of Actual data divided by the summation of Forecast data for periods having actual data. A so-called reality ratio is then generated and is defined as equal to $[N/(N+1)]^2$, where N is the number of periods of actual data. The following is an example of this calculation:

| Fore | Act |
|---|---|
| 100 | 120 |
| 150 | 180 |
| 200 | |

The reforecast ratio (Rf) = (120 + 180)/(100 + 150) = 1.2. The reality ratio (R1) = $[\frac{2}{3}]^2$ = 0.445, since N = 2. The reforecast value for a subsequent period p, having an initial value ($V_p$), is then found from the equation: $V = V_p * [(1 + (Rf-1)) * R1]$. In this case, the reforecast value for the third period is then:

$$V_3 = 200 * [(1 + (1.2 - 1)) * .445] = 217.8$$

When actual MIS data is received, the reforecast process is automatically redone. This reforecasting is done against the original data, not against the reforecast base. That is, if a reforecast has increased a call volume by 25%, the automatic reforecast works against the base not the reforecast number.

Referring back to FIG. 10, the final subprocess for the Performance Analysis Screen is the subprocess 118 which provides the "what-if" capability of recalculating the Service Level for changes in the number of Open agents. The latter capability is purely a passive "what-if" function and the results are not stored.

Turning now to the build schedule management screen function 112, the timelines for the agents are provided from data received from the Individual Schedules dataset 102. The build function 112 generates the Schedule Management screen of FIG. 8. Active management changes are made by the "in-charge" supervisor by the process 120. Such changes are then immediately sent to the Individual Schedule dataset 102 and a corresponding dataset (not shown) located at the central computer. A send requirements subprocess 122 transfers requirements information from the build performance analysis screen function 110 to the build schedule management screen function 112. A central computer data handler function 124 handles the data traffic between the main computer and the workstation.

The list of MU agents and their schedules are obtained from the workstation Individual Schedules dataset 102. The net staffing field 67 represents the staffing requirements for the current quarter hour as determined by the position of the cursor relative to the schedule timescale 63. The first three variables of the net staffing field are obtained from the corresponding performance analysis screen and are adjusted to reflect quarter-hour requirements. The Closed Available value is obtained from the Individual Schedules dataset 102.

The force management system of the present invention also includes the capability to efficiently generate optimal workshifts ("tours") for agents and to generate schedules to satisfy agent preferences, availability and seniority. The tour/schedule generation method uses the following conventions:
1) "requirements" to mean a forecasted need for staffing, in quarter-hour intervals for some time period (e.g., a week),
2) "constraints" to mean the tour templates and their rules governing work schedules (e.g. amount of time worked, number of breaks, days and times of agent availability),
3) "preferences" to mean per-agent desires for particular kinds of work schedules within the limits imposed by the constraints, and
4) "selection policy" to mean precedence rules for deciding which agents work when staff supply exceeds the need.

The preferences desirably supported (in priority order) are: number of days worked, which days are worked and which are off, number of days for particular templates, which days are worked for particular templates, tour start times and lunch times. The task of schedule generation is to find a set of schedules, taking all the above factors into account, that are good or optimal according to some evaluation criteria. Examples of such criteria might be minimizing total overstaffing without allowing any understaffing, doling out available work time fairly among part-time personnel, minimizing labor cost while meeting at least 95% of projected staffing requirements, or many others.

Figure 11:
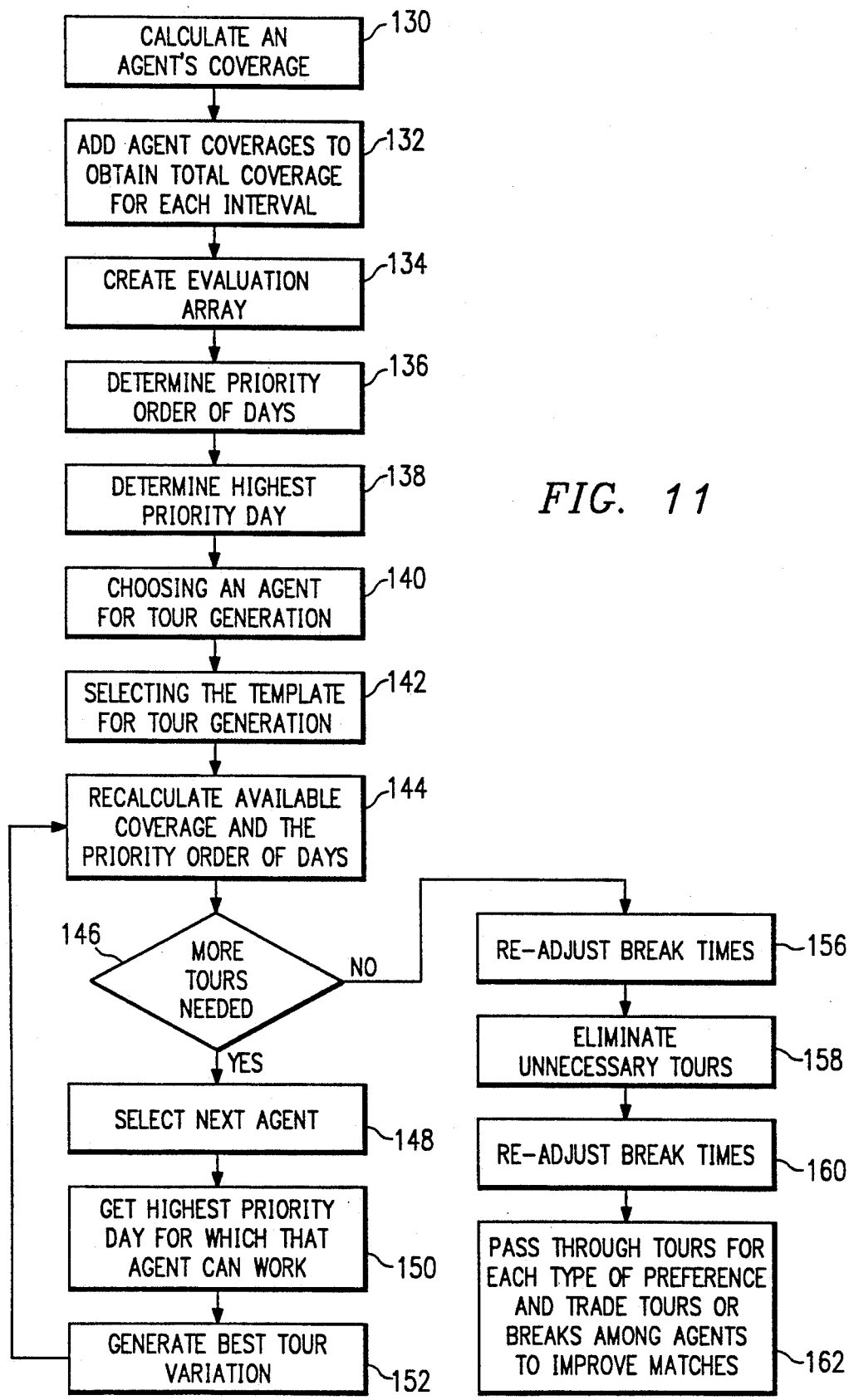
FIG. 11 is a detailed flowchart describing the tour/schedule generation algorithm of the present invention.

The tour/schedule generation method is shown in FIG. 11. The main routine begins at step 130. For each agent who may be used, this step calculates the days and time intervals and days the agent may possibly work. This set of days and time intervals is then called the "coverage" contributed by that agent. At step 132, all the agent coverages are added together to get total coverage for each interval of each day.

The method evaluates candidate tours based on a sum of the values assigned to each interval the tour covers. Using the staffing requirements and the tour evaluation heuristics, the method continues at step 134 to create a two-dimensional evaluation array (one dimension is the day of the week and the other is each 15 minute interval of the day) containing a running sum of the values for each interval of each day. By using this array it is possible to rapidly evaluate a candidate tour by looking only at the endpoints of its times worked. At step 136, using the staffing requirements and the previously calculated available coverage, the method then determines the priority order of days for tour generation. In this step the days are sorted by the ratio of requirements to available coverage.

While there are still days with requirements that can be satisfied, the method continues at step 138 to determine which day is the highest priority day among those for which tours can still be generated. Using the agent selection criteria and template evaluations, the method continues at step 140 to choose the agent for whom a tour should be generated. At step 142, a selection is made from among the templates available for the agent. In particular, the method selects the template and the variation of that template that has the highest "merit" according to the evaluation array, subject to general and agent-specific constraints. At step 144, the available coverage and the priority order of days is recalculated.

If at this point extra tours must be generated because of agent constraints (e.g. minimum days per week of work), the routine continues at step 146 and generates such tours as follows. While there are agents for whom more tours must be generated, the routine begins at step 148 by selecting the next agent (in no particular order). At step 150, the highest priority day for which that agent can work and does not already have a tour is then selected. The best tour variation is then generated at step 152 as described above. This subloop terminates upon recalculating the available coverage and the priority order of days in step 154.

The main routine continues at step 156 by making a pass through all the generated tours, re-adjusting break times to improve smoothness of the requirements coverage. At step 158, a pass is made through the generated tours looking for any that can be eliminated without violating staff requirements or agent constraints. Thereafter, at step 160, a second pass is made, re-adjusting break times.

At step 162, the routine then begins a pass through the generated tours for each type of preference supported. In each case, the method tries to trade tours or breaks among agents to improve the match between assigned tours and agent preferences, without violating any hard constraints or higher-priority preferences.

The following is a pseudocode listing of several of the subroutines of the main routine described above in FIG. 11:

CALCULATING AN AGENT'S COVERAGE For each tour template the agent may use on a given day:

Mark as covered all intervals from the earliest allowed start to the sum of (latest start time plus tour length plus maximum split length.

If the template has a required split and all combinations of tour start and split length would leave some intervals within the split, unmark those intervals.

If the allowed slack in tour start time and break start times are such that some intervals will be within a break under any template variation, unmark those intervals.

Logically OR the marked intervals with those marked from other templates.

Marked intervals constitute the agent's coverage.

CHOOSING AN AGENT FOR TOUR GENERATION

For every agent in the pool from which the routine is working:

If the agent already has a tour for this day or the agent is not available to work this day, do not choose this one.

If this agent must be used and if this day is necessary to make the agent's minimum allowed work days, choose this agent immediately.

If the current provisional choice does not have his/her minimum days requirement satisfied and the agent being examined does, do not choose this one.

If the routine has gotten this far, calculate the figure of merit for each of the agent's available tour templates. If no templates work for this day, don't choose this agent. Otherwise, note the merit figure for the best of the templates.

If there is no current provisional choice, if the provisional choice has his minimum days already and this agent does not, or if this agent's template merit is better than that of the current provisional choice, make this agent the provisional choice.

If this agent's merit figure is less than that of the provisional choice, don't choose this agent.

At this point, both a current provisional choice and this agent qualify to be chosen, and both have equal template merit figures. Determine the new provisions choice based on the following comparisons:

If both agents prefer to have this day off, make the less senior agent the provisional choice.

If only one of the agents prefers to have this day off, make the other one the provisional choice.

If neither agent wants this day off, make the more senior one the provisional choice unless getting this tour would cause that agent to exceed his preferred number of days worked.

SELECTING THE TEMPLATE FOR TOUR GENERATION

If the agent has only one template or only one that is valid for the day being handled, choose that one.

Determine the "slack" associated with each template. That is, the number of days for which other templates may be chosen without violating the minimum-use constraints for this template.

For every template available to the agent on this day:

If agent availability conflicts with the use of this template, do not choose it.

If "slack" considerations force the selection of a template other than this one, do not choose this one.

If choosing this template on this day would cause a conflict between the template's maximum-use constraint and its forced-days constraints, do not choose this template.

If the routine has not disqualified the template, calculate the merit of the template's best variation.

If this template's merit is the best so far, make it the provisional choice.

CHOOSING THE BEST VARIATION OF A TEMPLATE

Adjust earliest and latest allowed start times, if necessary, to account for agent availability, for "forced preference" start time, and for "consistent start time" constraints.

For all allowed start times:
For all allowed split lengths:
Form a candidate tour with the given start and split values.

Set the break within their allowed ranges so that they minimize the maximum requirement values in the break interval.

Calculate the merit value for this variation using the evaluation array. If it exceeds the best so far, make this variation the provisional choice.

VALUATION OF INTERVALS COVERED BY A TEMPLATE OR TOUR

Set the interval's merit value to zero.

If the current staffing requirement for an interval is equal to the maximum staffing requirement for the day, add the greater of (100) or (100 times the interval's staff requirement) to the merit value for the interval.

If the staff requirement in the interval is greater than zero, add 10 times the staff requirement to the interval's merit value. Otherwise, add the (non-positive) staff requirement to the merit value.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A method, using a computer, for scheduling personnel, the computer including a processor, an interface device and a memory for storing a control program and data, comprising the steps of:

(a) using the interface device to define one or more tour templates, each of said tour templates describing a bounded work shift having work rules and operating constraints for an environment in which there is a constantly varying event load by time of day and by day of week, the personnel including a team of servers of substantially equal skill responsible for servicing the constantly varying event load;

(b) using the interface device to define per-server preferences for particular kinds of work schedules within the limits imposed by said tour templates;

(c) using the interface device to define selection policy rules for determining which servers work when the number of servers exceeds a demand therefor;

(d) using the processor and data stored in the memory to generate a forecast of an event load expected to occur during a forecast time period and a number of servers required to service said forecasted event load during said forecast time period;

(e) using the processor and the control program to correlate the tour templates with the forecast to generate a set of candidate tours, each candidate tour defining a daily work schedule uniquely associated with the forecasted event load for a particular day yet theoretically fillable by any one of the personnel; and (f) using the processor and the control program to automatically schedule said servers to the candidate tours according to the preferences and the selection policy rules.

2. The method for scheduling personnel as described in claim 1 wherein step (f) comprises the steps of:

using the processor and the control program to calculate a server's available coverage for the tour templates the server may use on a given day;

using the processor and the control program to calculate a total coverage for all servers for each of a plurality of predetermined time intervals for each day of a week; and using the processor and the control program to determine a priority of days of the week for tour generation.

3. The method for scheduling personnel as described in claim 2 wherein step (f) further comprises the steps of:

using the processor and the control program to determine whether there are any days of the week that have staffing requirements that can be satisfied;

if that are any days of the week that have staffing requirements that can be satisfied, using the processor and the control program to determine which of said days has a highest priority; and for the highest priority day, using the processor and the control program to select a server for whom a tour should be generated.

4. The method for scheduling personnel as described in claim 3 wherein step (f) further comprises the steps of:

using the processor and the control program to select a tour template for the server for whom a tour should be generated; and using the processor and the control program to generate a tour for the server using the selected tour template.

* * * * *